2,960,513

Δ⁴-ANDROSTENE-7α-OL-3,17-DIONE AND ESTERS THEREOF

Richard W. Thoma, Somerville, and Josef Fried, New Brunswick, N.J., assignors to Olin Mathieson Chemical Corporation, New York, N.Y., a corporation of Virginia No Drawing. Filed Feb. 24, 1956, Ser. No. 567,478

3 Claims. (Cl. 260—397.4)

This invention relates to, and has for its object, the provision of steroids of the androstene or pregnene series having a 7α-hydroxy group, a 7α-acyloxy group or 6,7-unsaturation. More particularly, this invention relates to the following steroids: Δ⁴-pregnene-7α,17α,21-triol-3,20-dione (7α-hydroxy-Compound S), Δ⁴,⁶-pregnadiene-17α,21-diol-3,20-dione and Δ⁴-androstene-7α-ol-3,17-dione, as well as esters of each of these steroids, particularly esters thereof with organic hydrocarbon carboxylic acids of less than ten carbon atoms.

Δ⁴-pregnene-7α,17α,21-triol-3,20-dione, useful as an intermediate in the preparation of the other steroids of this invention, is prepared by subjecting Δ⁴-pregnene-17α,21-diol-3,20-dione (Compound S) to the action of enzymes of the microorganism *Diplodia natalensis* under oxidizing conditions. This oxidation can best be effected by either including the steroid in an aerobic culture of the microorganism, or by bringing together, in an aqueous medium, the steroid, air and enzymes of non-proliferating cells of the microorganism.

In general, the conditions of culturing *Diplodia natalensis* for the purposes of this invention are (except for the inclusion of the steroid to be converted) the same as those of culturing various other molds for the production of antibiotics and/or riboflavin, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be organic (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period may vary considerably, the range of about 6 to 96 hours being feasible, but not limiting.

The process yields, inter alia, Δ⁴-pregnene-7α,17α,21-triol-3,20-dione, a steroid useful not only as an intermediate in the preparation of the other steroids of this invention, but also in common with its mono and diester derivatives, as a mineralocorticoid (i.e., an agent causing the retention of sodium and excretion of potassium). Hence, Δ⁴-pregnene-7α,17α,21-triol-3,20-dione and esters thereof, particularly esters with organic hydrocarbon carboxylic acids of less than ten carbon atoms (e.g., the lower alkanoic acids as exemplified by acetic, propionic and enanthic acid, the aralkanoic acids as exemplified by α-toluic and β-phenylpropionic, and the aromatic acids as exemplified by benzoic and o, m, or p-toluic acid) can be used in lieu of known salt-retaining steroids, and may be administered parenterally in the treatment of Addison's disease, being formulated for such administration in the same type of preparations as desoxycorticosterone acetate, for example, with concentration and/or dosage based on the activity of the particular steroid.

The esters of Δ⁴-pregnene-7α,17α,21-triol-3,20-dione are prepared in the usual manner, as by treatment with the desired acid anhydride or acyl halide in an organic solvent (preferably an organic base such as pyridine) to yield either the 21-mono ester or the 7α,21-diester depending on the ratio of acylating agent to steroid present in the reaction mixture. Δ⁴-pregnene-7α,17α,21-triol-3,20-dione can also, if desired, be dehydrated in the usual manner, as by treatment with a base (e.g., methanolic potassium hydroxide) to give Δ⁴,⁶-pregnadiene-17α,21-diol-3,20-dione, which can then, if desired, be esterified to the 21-ester.

Δ⁴,⁶-pregnadiene-17α,21-diol-3,20-dione and its 21-esters are also useful as mineralocorticoids. Hence, they can be used in lieu of known salt-retaining steroids and may be administered parenterally in the treatment of Addison's disease.

Δ⁴-pregnene-7α,17α,21-triol-3,20-dione can also be converted, if desired, to Δ⁴-androstene-7α-ol-3,17-dione by treatment with a bismuthate salt in an acid medium. Δ⁴-androstene-7α-ol-3,17-dione and 7α-esters thereof (particularly esters with organic hydrocarbon carboxylic acids of less than ten carbon atoms) are pharmacologically active steroids, useful as androgenic as well as protein anabolic agents. Hence these new steroids of the androstane series can be used in lieu of known androgenic or anabolic agents, and may be administered parenterally, for example, in the treatment of eunichoidism, being formulated for such administration in the same type of preparation as testosterone propionate, with concentration and/or dosage based on the activity of the particular compound.

The following examples are illustrative of the invention:

EXAMPLE 1

Δ⁴-pregnene-7α,17α,21-triol-3,20-dione (a) *Fermentation.*—A fermentation medium of the following composition is prepared:

| | g. |
|---|---|
| Dextrose | 10 |
| Corn steep liquor | 6 |
| $NH_4H_2PO_4$ | 3 |
| $CaCO_3$ | 2.5 |
| Yeast extract | 2.5 |
| Soybean oil | 2.2 |

Distilled water to make one liter.

The pH of the medium is adjusted to 7.0±0.1 with 2N NaOH solution, and 50 ml. portions of the medium are distributed in six 250 ml. flasks, the flasks plugged with cotton and sterilized by autoclaving for 30 minutes at 120° C. When cool, each of the flasks is inoculated with 1.0 ml. of a suspension prepared by using 7.0 ml. of water (with 0.01% Duponol as wetting agent) to suspend the sporulated growth of a 3 month old Sabouraud Dextrose agar slant (4 parts dextrose, 1 part neopeptone and 1.5 parts agar to 100 parts water) culture of *Diplodia natalensis* ATCC No. 9055 or derived strains; the parent organism is obtainable, inter alia, from the American Type Culture Collection, Washington, D.C.

The flasks are then mechanically shaken for 69 hours at 25° C. on a 280 cycle per minute rotary shaker, after which about 9% (v./v.) is transferred to each of 51 flasks containing 50 ml. of the same medium. After 48 hours incubation, a total of 638 mg. of $\Delta^4$-pregnene-17$\alpha$,21-diol-3,20-dione in 25.5 ml. of methanol (to give 0.25 mg. of steroid per ml. in the fermentation vessel) is added. The flasks are then incubated an additional 24 hours, after which the flasks are harvested, and the contents filtered through a Seitz pad and washed with water to give a final volume of filtrate and washings of 2480 ml.

(b) *Isolation of $\Delta^4$-pregnene-7$\alpha$,17$\alpha$,21-triol-3,20-dione.*—The culture filtrate (2480 ml.) is extracted with three 1500 ml. portions of chloroform and the combined extracts evaporated to dryness in vacuo. The crystalline residue (about 438 mg.) is washed with hexane and recrystallized from 95% alcohol. 125 mg. of $\Delta^4$-pregnene-7$\alpha$,17$\alpha$,21-triol-3,20-dione is obtained, which melts at about 245–247° C. and which after additional recrystallization melts, at about 248–250° C.; $[\alpha]_D^{24}+97°$ (c., 0.3 in 95% alcohol;

$\lambda_{max.}^{alc.}$ 241 m$\mu$ ($\epsilon = 16,000$); $\lambda_{max.}^{Nujol}$ 2.90$\mu$, 3.00$\mu$ and 3.08$\mu$ (OH), 5.91$\mu$, (20-keto), 6.10$\mu$, 6.20$\mu$ ($\Delta^4$-3-keto)

Anal. Calcd. for $C_{21}H_{30}O_5$ (362.45): C, 69.53; H, 8.34. Found: C, 69.76; H, 8.41.

$\Delta^4$-pregnene-7$\alpha$,17$\alpha$,21-triol-3,20-dione can be esterified as illustrated by the following example:

EXAMPLE 2

$\Delta^4$-*pregnene-7$\alpha$,17$\alpha$,21-triol-3,20-dione 7$\alpha$,21-diacetate*

A solution of 20 mg. of $\Delta^4$-pregnene-7$\alpha$,17$\alpha$,21-triol-3,20-dione in 0.5 ml. of pyridine and 0.5 ml. of acetic anhydride is allowed to stand overnight at room temperature. Removal of the excess reagents in vacuo leaves a crystalline residue (about 26 mg.) which after two recrystallizations from acetone-hexane furnishes the pure $\Delta^4$-pregnene-7$\alpha$,17$\alpha$,21-triol-3,20-dione diacetate having the following properties: M.P. about 180–182° C.; $[\alpha]_D^{23}+39°$ (c., 0.40 in CHCl$_3$);

$\lambda_{max.}^{alc.}$ 238 m$\mu$ ($\epsilon = 15,500$); $\lambda_{max.}^{Nujol}$ 2.88$\mu$ (OH); 5.75$\mu$, 5.79$\mu$ (acetyl and 20-keto), 6.00$\mu$, 6.18$\mu$ ($\Delta^4$-3-keto)

Anal. Calcd. for $C_{25}H_{34}O_7$ (446.52): C, 67.24; H, 7.68. Found: C, 67.63; H, 7.70.

Similarly by substituting other acid anhydrides, such as propionic anhydride, or acyl halides, such as benzoyl chloride, for the acetic anhydride in the procedure of Example 2, the corresponding ester derivatives are produced. Furthermore, if only one mole equivalent of acetic anhydride is used in the procedure of Example 2, the 21-monoacetate is obtained.

$\Delta^4$-pregnene-7$\alpha$,17$\alpha$,21-triol-3,20-dione can be dehydrated as illustrated by the following example:

EXAMPLE 3

$\Delta^{4,6}$-*pregnadiene-17$\alpha$,21-diol-3,20-dione*

A solution of 50 mg. of $\Delta^4$-pregnene-7$\alpha$,17$\alpha$,21-triol-3,20-dione in 2 ml. of 2.5% methanolic potassium hydroxide is allowed to stand at room temperature for 24 hours. During this period of time, the ultraviolet maximum at 241 m$\mu$ gradually decreases and gives way to a maximum at 285 m$\mu$ characteristic of the $\Delta^{4,6}$-3-ketone grouping. The solution is neutralized with dilute acetic acid, water is added and the methanol is evaporated in vacuo. The resulting suspension is extracted with chloroform, the chloroform removed in vacuo and the resulting residue crystallized from acetone-hexane to give pure $\Delta^{4,6}$-pregnadiene-17$\alpha$,21-diol-3,20-dione.

$\Delta^{4,6}$-pregnadiene-17$\alpha$,21-diol-3,20-dione can be converted to its 21-ester derivatives by the procedure of Example 2.

$\Delta^4$-pregnene-7$\alpha$,17$\alpha$,21-triol-3,20-dione can also be converted to $\Delta^4$-androstene-7$\alpha$-ol-3,17-dione as illustrated by the following example:

EXAMPLE 4

$\Delta^4$-*androstene-7$\alpha$-ol-3,17-dione*

A solution of 40 mg. of $\Delta^4$-pregnene-7$\alpha$,17$\alpha$,21-triol-3,20-dione in 6 ml. of 50% acetic acid is agitated with 295 mg. of sodium bismuthate for 40 minutes at room temperature. The mixture is filtered and the filter cake washed with chloroform. The filtrate is extracted with chloroform and the chloroform extracts washed with water, sodium bicarbonate and again with water and dried over sodium sulfate. Evaporation of the solvent in vacuo leaves a residue which after recrystallization from acetone represents pure $\Delta^4$-androstene-7$\alpha$-ol-3,17-dione having the following properties: M.P. about 248–250° C.; $[\alpha]_D^{24}+155°$ (c., 0.28 in CHCl$_3$);

$\lambda_{max.}^{alc.}$ 242 m$\mu$ ($\epsilon = 16,000$); $\lambda_{max.}^{Nujol}$ 2.94$\mu$, (OH), 5.76$\mu$ (17-keto), 6.04$\mu$, 6.20$\mu$ ($\Delta^4$-3-keto)

Anal. Calcd. for $C_{19}H_{26}O_3$ (302.40): C, 75.46; H, 8.67. Found: C, 75.44; H, 8.91.

$\Delta^4$-androstene-7$\alpha$-ol-3,17-dione can be converted to its 7$\alpha$-ester as illustrated in the following example:

EXAMPLE 5

$\Delta^4$-*androstene-7$\alpha$-ol-3,17-dione 7$\alpha$-acetate*

A solution of 25 mg. of $\Delta^4$-androstene-7$\alpha$-ol-3,17-dione in 0.5 ml. of pyridine and 0.5 ml. of acetic anhydride is allowed to stand overnight at room temperature. Removal of excess reagents in vacuo leaves a crystalline residue which after two recrystallizations from acetone-hexane furnishes the pure $\Delta^4$-androstene-7$\alpha$-ol-3,17-dione 7$\alpha$-acetate.

Similarly by substituting other acid anhydrides, such as propionic anhydride, or acyl halides, such as benzoyl chloride, for the acetic anhydride in the procedure of Example 5, the corresponding ester derivatives are produced.

The invention may be variously otherwise embodied within the scope of the appended claims.

We claim:
1. $\Delta^4$-androstene-7$\alpha$-ol-3,17-dione.
2. An ester of $\Delta^4$-androstene-7$\alpha$-ol-3,17-dione with an organic hydrocarbon carboxylic acid of less than ten carbon atoms.
3. $\Delta^4$-androstene-7$\alpha$-ol-3,17-dione 7$\alpha$-acetate.

References Cited in the file of this patent

UNITED STATES PATENTS

| | | |
|---|---|---|
| 2,662,854 | Miescher | Dec. 15, 1953 |
| 2,671,096 | Murray | Mar. 2, 1954 |
| 2,697,715 | Eppstein | Dec. 21, 1954 |
| 2,739,974 | Colton | Mar. 27, 1956 |
| 2,753,290 | Fried | July 3, 1956 |

OTHER REFERENCES

Sondheimer et al.: Experientia, vol. 9, pgs. 62–3 relied on (1953).